F. W. NORTON.
AUTOMOBILE CONTROLLING DEVICE.
APPLICATION FILED JUNE 26, 1918. RENEWED JULY 21, 1919.
1,332,228.
Patented Mar. 2, 1920.
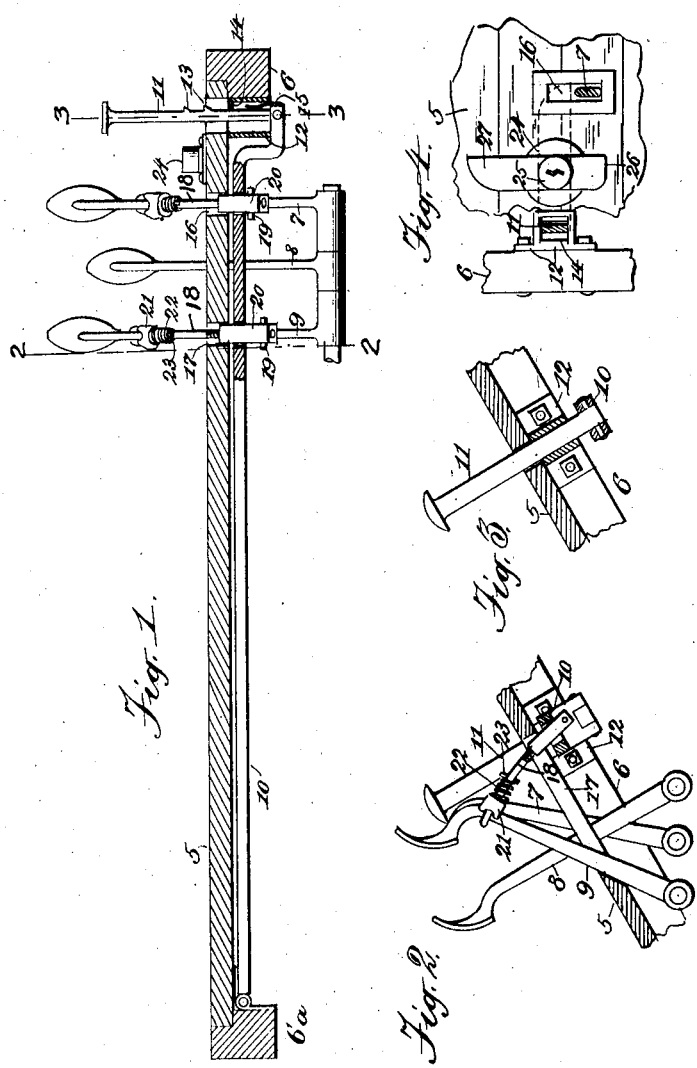

UNITED STATES PATENT OFFICE.

FRANK W. NORTON, OF MINNEAPOLIS, MINNESOTA.

AUTOMOBILE-CONTROLLING DEVICE.

1,332,228. Specification of Letters Patent. Patented Mar. 2, 1920.

Application filed June 26, 1918, Serial No. 242,000. Renewed July 21, 1919. Serial No. 312,269.

*To all whom it may concern:*

Be it known that I, FRANK W. NORTON, a citizen of the United States, residing at Minneapolis, in the county of Hennepin and State of Minnesota, have invented certain new and useful Improvements in Automobile-Controlling Devices; and I do hereby declare the following to be a full, clear, and exact description of the invention, such as will enable others skilled in the art to which it appertains to make and use the same.

This invention relates to the control of automobiles, and has for its object to provide means whereby the clutch mechanism may be moved to neutral position and the brake simultaneously engaged by the action of a single foot-lever. A further object is to provide means for locking the automobile when idle, and with the brake set or disengaged, at will.

The nature of the invention is fully disclosed in the description and claims following, reference being had to the accompanying drawing, in which:

Figure 1 is an elevation, partly sectional, showning mechanism embodying the invention as seen from the front. Fig. 2 is a section of the same, taken in the line 2—2. Fig. 3 is a section in the line 3—3. Fig. 4 is a fragmentary top view, showing the lock and adjacent parts.

Referring to the drawing, the numeral 5 denotes the floor and 6 the sills of an automobile body. Through the floor, suitably slotted for the purpose, pass foot levers 7, 8 and 9, of which 7 is the principal operating lever controlling the neutral and driving positions of the clutch, not shown. 8 is the reverse lever, and 9 the brake lever. All the foregoing parts are of wellknown construction, and need no special description. This invention involves the connection of mechanism with the main lever and the brake-lever, and is described as follows:

To the sill 6ª is hinged a bar 10 extending under the floor and across this portion of the automobile body. At the free end, near the operating levers, is pivotally connected a pedal 11 which may swing laterally a limited distance but is otherwise guided in a housing 12 attached to the sill 6. The shaft of this pedal is provided with teeth 13 to engage a lip 14 of the guide. A spring 15 tends to hold the pedal away from the lip, but permits the teeth to engage it successively, when the pedal is forced downwardly and outwardly. The pedal is easily released by a sidewise movement of the foot in the opposite direction. Through holes 16 and 17 in this bar pass links 18 connecting it operatively in one direction with the levers 7 and 9. These links are of similar construction, but differ in length, so as to permit the lever 7, which may be designated as the clutch-lever, to be moved to a midway, neutral position before the brake-lever comes into action. It will be seen that the bar acts on the links to force the levers downwardly by engaging studs 19, but is free to move in the opposite direction independently of the links. This allows for the normal use of the foot-levers quite independent of the bar, when it is in idle position close under the foot-board 5. The links are made adjustable as to length by long square nuts 20 screwing on the link-rods. Being square, and playing in square holes in the bar, they cannot be conveniently detached to release the car when locked, as will be explained presently. The links are easily connected with the foot-levers by forming the upper end of the link-rod as a hook to engage the upper edge of the lever, and mounting below it a sleeve 21 engaging the under edge of the lever, and held in position by a spring 22 between the sleeve and a suitable abutment, such as a stud 23.

The device is very useful and convenient as an emergency control, especially in the case of women drivers, since the automobile may be brought to slow speed, or a dead stop by the action of a single foot, and without "killing the engine." All the driver need do is to press the pedal. The first action throws the clutch to neutral position, which leaves the engine free to run at will, and subject to throttle control at the hand wheel, in the usual way. A little farther forward movement of the pedal brings the brake into action, arresting or stopping the car. This is the limit of the pedal's movement, and at this point the upper tooth of the pedal is in position to engage the holding lip. The other tooth engages before the brake takes hold. For slow speed and high speed forward, the lever 7 is used in the usual way, the brake being of course released.

The device facilitates the complete locking of the car with the clutch at neutral, and with the brake set or unset, as desired. Where, as in cities, the car must be parked with loose brakes, so as to be readily moved in case of fire, or other emergency, the pedal is pushed to the first position, with clutch at neutral and brake unset. In the country the final, brake-set position may be used.

A simple lock is illustrated in Figs. 1 and 4. The lock 24 may be of any desired type, but having a partially rotating tumbler 25 provided with arms 26 and 27. When turned to the position indicated by the dotted lines in Fig. 4 the arm 26 abuts against the shank of the pedal, and holds it over against the tooth engaging lip. The bar 27 at the same time lies across the forward path of the foot-lever 7, and prevents any forward movement thereof.

Having thus described my invention, I claim:

1. In combination with the brake-lever and main operating lever of an automobile, an auxiliary foot-lever, and links connecting the same with the brake-lever and main lever, the links having slip connection with said auxiliary lever, whereby it acts operatively in but one direction.

2. In combination with the brake-lever and the main clutch-lever of an automobile, an auxiliary foot-lever, and slip-links connecting the same operatively and successively with the clutch and brake-levers.

3. In combination with the brake-lever and main clutch-lever of an automobile, an auxiliary foot-lever, a swinging pedal attached thereto, means to engage the pedal at one or more points of forward thrust, and slip-links connecting the foot-lever successively with the clutch-lever and brake-lever.

4. In combination with the brake-lever and main clutch-lever of an automobile, an auxiliary lever with angular holes therein, link-rods connecting with the clutch-lever and brake-lever, angular nuts adjustable on said link-rods, and studs thereon to engage the auxiliary lever on one side.

5. In combination with the main clutch-lever and brake-lever of an automobile, and with an auxiliary lever coöperating therewith, perforated for slip-links, the described links, comprising each a hook, a sleeve adjacent thereto, a spring to press it toward the hook, and a nut at the other end of the hook and mounted slidably in the holes of the auxiliary lever.

6. Combined with the main clutch-lever and brake-lever of an automobile, an auxiliary lever to operate them successively, a latching pedal connected with said auxiliary lever, and a lock to fix the pedal in latched position and to arrest any forward movement of the clutch-lever.

7. Combined with the main clutch-lever and brake-lever of an automobile, an auxiliary lever to operate them successively, a latching pedal connected therewith, and a lock to swing into the path of the clutch-lever and abut against the pedal to hold it in latched position.

8. Combined with the main clutch-lever and brake-lever of an automobile, an auxiliary lever to operate them successively, a latching pedal connected with said auxiliary lever, and a spring tending to hold said pedal normally out of latching position.

In testimony whereof I affix my signature in presence of two witnesses.

FRANK W. NORTON.

Witnesses:
J. M. St. John,
J. R. Buresh.